United States Patent [19]

Norpoth et al.

[11] Patent Number: 5,298,326
[45] Date of Patent: Mar. 29, 1994

[54] COOK IN FILM WITH IMPROVED SEAL STRENGTH AND OPTICS

[75] Inventors: Lawrence R. Norpoth; Donna S. Bentley, both of Simpsonville, S.C.

[73] Assignee: W. R. Grace & Co.-Conn., Duncan, S.C.

[21] Appl. No.: 858,825

[22] Filed: Mar. 27, 1992

[51] Int. Cl.⁵ .................................................. B32B 7/12
[52] U.S. Cl. ............................ 428/349; 428/34.8; 428/36.7; 428/520; 428/516; 428/910; 426/127
[58] Field of Search ................ 428/349, 516, 36.7, 428/34.8, 520, 910; 426/127

[56] References Cited

U.S. PATENT DOCUMENTS

| | | | |
|---|---|---|---|
| 4,303,711 | 12/1981 | Erk et al. | 428/36 |
| 4,411,919 | 10/1983 | Thompson | 426/412 |
| 4,448,792 | 5/1984 | Schirmer | 426/113 |
| 4,469,742 | 9/1984 | Oberle et al. | 428/215 |
| 4,568,580 | 2/1986 | Ghirardello et al. | 428/35 |
| 4,601,929 | 7/1986 | Erk et al. | 428/36 |
| 4,608,302 | 8/1986 | Schirmer | 428/349 |
| 4,762,748 | 8/1988 | Oberle | 428/349 |
| 4,855,183 | 8/1989 | Oberle | 428/345 |
| 4,879,124 | 11/1989 | Oberle | 426/113 |
| 4,909,726 | 3/1990 | Bekele | 428/34 |
| 4,937,112 | 6/1990 | Schirmer | 428/34 |
| 4,977,022 | 12/1990 | Mueller | 428/349 |

Primary Examiner—Edith Buffalow
Attorney, Agent, or Firm—William D. Lee, Jr.; Mark B. Quatt; Rupert B. Hurley, Jr.

[57] ABSTRACT

Multiple layer cook-in films are disclosed from which packages such as bags or casings can be made. The films have a first food contact layer with a core layer adhered thereto which includes a blend of a polymeric material having a high molecular weight and a fractional melt index and an ethylene alpha-olefin copolymer. The film further includes an abuse layer which has, at least, a polymeric material having a high molecular weight and a fractional melt index. Improved hold cold seal strength fresh and over time, improved orientation processing and lower shrink temperatures are obtained with the present core layer. The abuse layer and core layer adds to the processability of the material and improves optics.

35 Claims, No Drawings

COOK IN FILM WITH IMPROVED SEAL STRENGTH AND OPTICS

FIELD OF THE INVENTION

The field of the invention is a packaging film from which bags and casings can be made which have improved structural soundness so that they may be fully characterized as "cook-in." The term "cook-in" as used herein is intended to refer to packaging material structurally capable of withstanding exposure to time-temperature conditions while containing a food product.

This invention relates generally to thermoplastic films suitable for cook-in packaging, and more particularly to food cook-in films. These films may have food contact surface characteristics which promote binding adherence to a contained food product during cook-in. The films of the invention exhibit improved hot and cold seal strength, improved optics and are more readily processable than known films.

PRIOR ART

Cook-in packaged foods are essentially foods cooked in the package in which they are distributed to the consumer and which may be consumed with or without warming. Cook-in time-temperature conditions typically refer to a long slow cook, for example, submersion in hot water at about 55° C. to about 65° C. for about 1 to about 4 hours. These conditions are representative of institutional cooking requirements. Submersion at about 70° C. to about 100° C. for up to about 12 hours represents the limiting case. Under such conditions, a cook-in packaging material should maintain seal integrity, i.e., any heat sealed seams should resist being pulled apart during cook-in. The film should also be heat sealable to itself and, the packaging film substantially conformable to the contained food product. Preferably, this substantial conformability is achieved by the film being heat shrinkable under these conditions so as to form a tightly fitting package, i.e., the film should be heat shrinkable under these time-temperature conditions and should possess sufficient shrink energy so that submerging the packaged food product in hot water will shrink the packaging film snugly around the contained product, and especially up to about 55% monoaxial and/or biaxial shrinkage.

The film may also have food product adherence to restrict "cook-out" or collection of juices between the surface of the contained food product an the food contact surface of the packaging material during cook-in, thereby increasing product yield. More particularly, in the types of multilayer films wherein the first "sealing and food contact" layer is of the type of material that adheres to a contained food product during cook-in, this first layer may alternatively be referred to as the "adhering layer." As used herein, there term "adhere" is intended to means that the food contact surface of the film bonds during cook-in to the contained food product to an extent sufficient to substantially prevent accumulation of fluids between the film and the contained product.

A heat shrinkable, cook-in film is described by Oberle et al, U.S. Pat. No. 4,469,742 that includes a first "sealing or food contact" layer of a nonlipophillic polymeric material having a softening point greater than that of the following shrink layer; a second layer, of an ethylene homopolymer or copolymer melt bonded to the firs layer; a third or adhesive layer, melt bonded to the second layer, of a chemically modified polyethylene being irradiatively cross-linkable and having functional groups with a relatively strong affinity for the following barrier layer,; a fourth or barrier layer of a hydrolyzed ethylene vinyl acetate copolymer melt bonded to the third layer; a fifth or adhesive layer as in said third layer, melt bonded to the fourth layer; and a sixth or abuse layer, melt bonded to the fifth layer. In one embodiment, the first "sealing and food contact" layer is an ionomer, a metal salt neutralized copolymer of an olefin and a carboxylic acid, representatively Surlyn TM, which is a type of material that adheres to a contained meat product during cook-in. This Surlyn TM layer also functions as a protein-adhering layer. In another embodiment, the sealing layer is a propylene-ethylene random copolymer having form 1% to 6% by weight of ethylene. The patent also describes a method for making the film including full coextrusion and selective irradiation and orientation.

In the conventional method of manufacturing heat shrinkable film as described by Oberle et al, a tubular orientation process is utilized wherein a primary tube of the film is biaxially oriented by formation of a bubble to create internal pressure and induce stretching in the transverse direction and with the use of pinch rolls at different speeds to induce stretching in the machine direction. The films of the present invention are easily oriented with the incidence of bubble breakable during orientation minimized, and in some cases, eliminated. The stretched bubble is then collapsed, and the film is wound up as flattened, seamless, tubular film to use later to make bags, e.g., either end-seal bags typically made by transversely heat sealing across the width of flattened tubing followed by severing the tubing so that the transverse seal forms the bag bottom, or side-seal bags in which the transverse heat seals form the bag sides and one edge of the tubing forms the bag bottom. Such bags are typically used by placing the food product in the bag, evacuating the bag, and either heat sealing the bag mouth or gathering and applying a metal clip around the gathered mouth of the bag to form a seal. The bag is then immersed in hot water at approximately the same temperature at which the film was stretch oriented, typically about 160° to 205° F. (61° to 96° C.), hot water immersion being one of the quickest and most economical means of transferring sufficient heat to the film to shrink it uniformly. Alternatively, the bag may serve as a liner of a cooking mold.

A plastic, adhering cook-in package such as a casing is described by Schirmer, in U.S. Pat. No. 4,606,922 as well as a method for enhancing yield of a cook-in package meat product. The method includes first providing an adhering cook-in container including a flexible thermoplastic envelope being substantially conformable to a contained meat product and having an inner meat-contacting surface of a selectively irradiated ionomer, then conforming the container about a selected meant product and cooking the package product, whereupon the inner surface of the envelope bonds to the meat product substantially to prevent cook-out of fluids.

A flexible plastic adhering cook-in package is described by Thompson in U.S. Pat. NO. 4,411,919, as well as a method for enhancing yield of cook-in packaged meat product. The method includes: providing an adhering cook-in package comprising a flexible plastic container substantially conformable to a selected mean product and having an inner meat product contacting surface of polymeric olefin. This container is subjected to an energetic radiation surface treatment in the presence of oxygen sufficient to cause the inner surface to adhere to the meat product during cook-in, the container having been formed from hot blown tubular film. The package is conformed about a selected meat product followed by cooking the packaged product, whereupon the inner surface adheres to the meat product to substantially prevent cook-out of fluids.

Erk et al, U.S. Pat. No. 4,303,711, describes a tubular film consisting of biaxially stretched plastic material for packing and casing, paste type foodstuffs that are heated after packing or are packed in a hot fluid state. The film is a mixture of approximately 50-99 parts by weight of at least one aliphatic polyamide and approximately 1-50 parts by width of one or more members of the group consisting of an ionomer resin, a modified ethylene vinyl acetate copolymer and a modified polyolefin.

Erk et al, U.S. Pat. No. 4,601,929, relates to a single layer of polyamide film for packing and casing foodstuffs in past form, especially food stuffs that are packed when hot or are subject to heat treatment after packing.

Ghiradello et al, U.S. Pat. No. 4,568,580, relates to an article of manufacture for packaging food products comprising a first film section having at least one surface comprising a copolyamide obtained by random copolymerization of precursor monomers of at least two different polyamides. The article includes a second film section of a film having a surface comprising the aforesaid copolyamide and at least one heat weld between the copolyamide surfaces of said first and second film sections. The article is capable of withstanding heat treatment at temperatures from 70° C. to 120° C. for at least 10 minutes without suffering damage to the heat weld.

Oberle, U.S. Pat. No. 4,855,183 discloses a cook-in film having a first food contact layer comprising a polyamide composition.

Oberle, U.S. Pat. NO. 4,762,748 described a cook-in shrink film characterized by the presence of ethylene alkyl acrylate copolymer in core layer and abuse layers, in adhesive layers, or both. The sealing layer is selected from the group consisting of a propylene ethylene copolymer, an ionomer, a blend of a linear low density polyethylene and an ionomer, and a blend of a linear low density polyethylene and an ethylene acrylic acid copolymer.

Schirmer, U.S. Pat. No. 4,448,792, describes a cook-in shrink bag having a sealing and food contact layer of a propylene homopolymer or copolymer, preferably a propylene-ethylene copolymer of low ethylene content. A core layer adjacent the sealing layer is a blend of propylene homopolymer or copolymer. Also included are a barrier layer, an abuse layer and adhesive layers sandwiching the barrier.

Oberle, U.S. Pat. NO. 4,879,124, describes a perforated cook-in shrink bag. Preferable materials for the sealing layer include ethylene-acrylic acid copolymers, ethylene methacrylic acid copolymers, ionomers and blends of such.

Schirmer, U.S. Pat. No. 4,608,302, describes oriented films from propylene copolymers and unplasticized Saran which are suitable for use in the packaging of prepared food products. A core layer may comprise an ethylene vinyl acetate copolymer having a vinyl acetate content if from 10% to 12% by weight and a factional melt index. The core layer is adjacent a sealing layer which is a propylene homopolymer or copolymer which may be a propylene ethylene copolymer.

Bekele, U.S. Pat. No. 4,909,726, describes an impact resistant film for chub packaging. Various layers may contain polymeric material of fractional melt index.

Mueller, U.S. Pat. No. 4,977,022, describes a barrier stretch film with at least one interior layer which may comprise an ethylene vinyl acetate copolymer of fractional melt index.

Schirmer, U.S. Pat. NO. 4,937,112, describes a film for chub packaging which includes an olefin sealing layer and a core layer adjacent the sealing layer which comprises a polymeric material of high molecular weight and fractional melt index selected from the group consisting of high density polyethylene, low density polyethylene and ethylene vinyl acetate copolymer.

It is thus an object of the present invention to provide a novel cook-in film which is readily biaxially oriented.

It is a further object of the present invention to provide a novel cook-in film that has improved biaxial orientability as a tube by means of forming a bubble wherein bubble breakage is substantially minimized or eliminated.

It is a further object of the present invention to provide a method for manufacturing such a novel cook-in film wherein the core layer comprises a blend of a polymeric material having a high molecular weight and a fractional melt index and an ethylene alpha-olefin copolymer.

It is a further object of the present invention to provide a method for manufacturing such a novel cook-in film wherein the abuse layer comprises a blend of a polymeric material having a high molecular weight and fractional melt index.

It is a further object of the present invention to provide a novel cook-in film that has improved seal strength both fresh and aged.

It is a further object of the preset invention to provide a novel cook-in film with improved optics.

It is a further object of the present invention to provide such a cook-in film where the film has a coloring agent incorporated therein.

It is a further object of the present invention to provide a novel cook-in film that ha lower shrink temperature settings in use.

Additional objects and advantages of he invention will be set forth in part in the description which follows and in part will be apparent to a person with ordinary skill in the art from the description, or may be learned by practice of the invention. The objects and advantages of the invention may be realized and attained by means of the instrumentalities and combination particularly pointed out in the appended claims.

SUMMARY OF THE INVENTION

These and other objects have been achieved according to the present invention which comprises a novel cook-in film having a core layer comprising a blend of a polymeric material having a high molecular weight and a fractional melt index and an ethylene alpha-olefin copolymer and an abuse layer which has, at least, a polymeric material having a high molecular weight and a fractional metal index. A sealing and food contact layer is preferably disposed immediately adjacent the core layer. A barrier layer, followed by the abuse layer, may be placed on the core layer, in that order, in another embodiment of the invention, each of these layers optionally being bonded to adjacent layers by a tie layer.

DETAILED DESCRIPTION OF THE INVENTION

Generally, films with improved optics, processability and heat seal characteristics in accordance with the present invention have the structure: (sealing and food contact layer)/(core layer)/(abuse layer) or (sealing and food contact layer)/(core layer)/(barrier layer)(abuse layer), wherein the core layer comprises a blend of a polymeric material having a high molecular weight and a fractional melt index and an ethylene alpha-olefin copolymer. The abuse layer includes, at least, a polymeric material having a high molecular weight and fractional melt index. The sealing and food contact layer may be an ethylene propylene copolymer, an ethylene alpha-olefin copolymer, an ethylene acrylic acid copolymer or methacrylic acid copolymer, or an ionomer. The ethylene alpha-olefin copolymer of the core layer is chosen for its compatibility with the polymeric composition of the sealing layer. It has been found that regardless of the polymer or blend selected for the sealing layer, seal strength is improved by disposing the core layer of the present invention adjacent thereto. These films are manufactured by extruding the core layer into a multiple layer film with the sealing layer and the abuse layer as outer skin layers, with some or all of the layers being subjected to irradiation.

Thus, the film of the present inventions includes the sealing layer, a core layer which is a blend of a polymeric material of a high molecular weight and fractional melt index and an ethylene alpha-olefin copolymer, and an abuse layer which has at least a polymeric material of a high molecular weight and fractional melt index. In the most preferred application, that is the use of the present film as a cook-in film or bag, the sealing layer is also a food contacting layer which may or may not bindingly adhere to the food product which si cooked n the material. Most preferably, the core layer of the present film is immediately adjacent to the sealing layer with a particular ethylene alpha-olefin of the core layer blend being chose for its compatibility with the polymeric composition of the sealing layer. In a most general sense, copolymers of ethylene and alpha-olefins having from 3 to 10 carbon atoms are suitable for use in the core layer. However, an ethylene propylene copolymer is preferred if the sealing layer is a propylene ethylene random copolymer or an ethylene, propylene, higher alpha-olefin terpolymer. A preferred ethylene propylene copolymer for use in the core layer is Tafmer P-0480 sold by Mitsui. Higher alpha-olefins are preferred as the comonomer when the sealing layer is a linear ethylene alpha-olefin copolymer having a comonomer with from four to ten carbon atoms, an ethylene acrylic acid copolymer, an ethylene methacrylic acid copolymer, an ionomer or a blend of any of these. A preferred higher alpha-olefin for use in the core layer is Dow's Dowlex 2045-03, an ethylene 1-octene copolymer, commonly referred to as linear low density polyethylene.

The core layer also includes a polymer or copolymer having a high molecular weight and fractional melt index. Appropriate resins within the scope of the present invention include ethylene vinyl acetate copolymers, ethylene methacrylate copolymers, ethylene butyl acrylate copolymers, or low density polyethylenes which have the appropriate melt index. "Fractional melt index" is used herein to define a material with a melt index of less than about 1 gram/10 minutes at standard ASTM conditions. For any given resin, the melt index indicates the amount, in grams, of that resin which can be forced through a given orifice under a specified temperature and pressure in 10 minutes. The value should be determined in accordance with ASTM D1238. A preferred commercially available resin is PE1651 supplied by Rexene Products Company which is an ethylene vinyl acetate copolymer having a vinyl acetate content of about 6.5% by weight, and a 0.5 melt flow. The fractional melt flow resin of the present invention improves orientability, which in one aspect contributes to improved optics. The blend of a high melt flow resin with an ethylene alpha-olefin copolymer immediately adjacent to the sealing layer of the present film provides improved interply adhesion resulting in improved seal strength and cook-performance.

The abuse layer of the present film also includes a fractional melt flow resin. In such layer, the high molecular weight material contributes to improved processability including orientability and further contributes to the film's excellent optical characteristics.

Looking more particularly to the core layer of the present film, the blend ratio is preferably from about 60% to about 90% by weight of the fractional metal index resin and from about 1% to about 40% by weight of an ethylene alpha-olefin. Most preferably, the core layer has from about 70% to about 90% by weight of a fractional melt index resin and from about 10% to about 30% by weight of an ethylene alpha-olefin. Optimally, the core layer has from about 70% to about 80% by weight of a fractional melt index resin and from about 20% to about 30% by weight of an ethylene alpha-olefin resin. However, when it is desirable to provide a colored film or bag in accordance with the present invention, it is possible to incorporate a colorant into the present core layer. In such case, the core layer preferably comprises from about 20% to about 60% by weight of a polymeric material of a high molecular weight and fractional melt index, from about 5% to about 70% of an ethylene alpha-olefin copolymer, from about 10% to about 35% of a color concentrate. However, the colorant may also be included in other layers such as the abuse layer as discussed below. A preferred commercially available colorant is EPE 10214-C, a 50% TIO2, 50% LDPE, white color concentrate supplied by Teknor Color. Another example of a colorant which may be employed in accordance with the present invention is EV-8598, a red color concentrate also supplied by Teknor Color.

Looking more particularly to the abuse layer of the present film, in addition to the high molecular weight fractional melt index resin contained therein, such layer may further contain an ethylene homopolymer or copolymer. In a preferred embodiment such ethylene homopolymer or copolymer may be an ethylene alpha-olefin copolymer such as that provided in the core layer. In a more preferred embodiment, the abuse layer may contain the same ethylene alpha-olefin as is present int eh core layer. A preferred resin for inclusion in both the core and the abuse layers is a linear ethylene 1-octene copolymer sold as Dowlex 2045-03 by Dow. Thus the abuse layer may contain from about 60% to about 99% by weight of a fractional metal index resin blended with from about 1% to about 40% by weight of an ethylene homopolymer or copolymer. A more preferred blend is from about 70% to about 90% by weight of a fractional melt index resin with from about 10% to about 30% by weight of an ethylene homopolymer or copolymer. When a colorant is added to the abuse layer, the preferred ratio is from about 35% to about 80% of a fractional melt index resin, from about 10% to about 30% of an ethylene homopolymer or copolymer, and from about 10% to about 35% of a color concentrate.

The cook-in film of the present invention comprises any of a variety of multilayer cook-in packaging films so long as the core layer of the film comprises a blend of a high molecular weight, fractional melt flow polymer or copolymer blended with an ethylene alpha-olefin copolymer formed for example by the copolymerization of ethylene and an alpha-olefin by means of a Ziegler-Natta catalyst, although ethylene alpha-olefins produced by other copolymerization processes and other catalyst systems are also within the scope of the present invention.

The term alpha-olefin copolymers s defined herein refers to copolymers of ethylene with one or more comonomers selected from $C_3$ to about $C_{10}$ alpha-olefins such as propylene, butene-1, pentene-1, hexene-1, octene-1, and the like in which the polymer molecules comprise long chains with few side chains or branches and sometimes are referred to as linear polymers. The distribution of the side branches depends on the catalyst system employed in the copolymerization process. The side branching is short as compared to non-linear polyethylenes. The molecular chains of a linear polymer may be intertwined, but the forces tending to hold the molecules together are physical rather than chemical and thus may be weakened by energy applied in the form of heat. The ethylene alpha-olefin polymers have a density in the range from about 0.860 g/cc to about 0.940 g/cc, more preferably in the range of from about 0.870 g/cc to about 0.920 g/cc for purposes of the present invention. The melt flow index of these polyethylenes generally ranges from between about 0.1 to about 10 grams per ten minutes and preferably between from about 0.5 to about 3.0 grams per ten minutes (ASTM D 1238).

Thus, the invention comprises at a minimum, the foregoing (sealing and food contact layer)/(core layer)/(abuse layer) and in further embodiments the minimal structure: (sealing and food contact layer)/(core layer)/(barrier layer)/(abuse layer). Each of the layers may also be optionally bonded to one another by a tie layer as well.

The food contact layer can optionally be subjected to an energetic radiation treatment, including, but not limited to corona discharge, plasma, flame, ultraviolet, and high energy electron treatment. For instance, the food contact layer may be selectively irradiated with high energy electrons which advantageously may be accomplished during irradiation of the overall multilayer film structure for cook-in integrity, as further discussed below. Radiation dosages are referred to herein in terms of the radiation unit "RAD," with one million RADS or a megarad being designated as "MR." A suitable radiation dosage of high energy electrons is in the range of up to about 12 MR, more preferably about 2 to about 9 MR.

The adhesive or tie layer will also comprise any polymer that will have excellent adhesion to the barrier layer and the core layer or the abuse layer or both the core layer and the abuse layer. The various polyethylenes including the polyethylene copolymers as described herein and the ethylene vinyl acetate copolymers are useful as tie layers employed according to the present invention. Preferably, the tie layer comprises an anhydride modified alpha-olefin copolymer having rubber moieties such as is contained in the core layer, discussed above. A preferred resin is Tymor 1203 from Morton International. Also suitable is Bynel 4107 from du Pont. However, any of the various adhesives well known in the art of film making may be employed, such as, for example, the Plexar (TM) adhesives supplied by Chemplex Co.

Suitable "polyethylenes" employed in other layers as discussed below ar the families of resins obtained by substantially polymerizing the gas ethylene, $C_2H_4$. By including comonomers, and varying catalysts and methods of polymerization, properties such as density, melt index, crystallinity, degree of branching and cross-linking, molecular weight and molecular weight distribution can be regulated over wide ranges. Further modifications are obtained by other processes such as halogenation, and compounding additives.

The term "ethylene vinyl acetate copolymer" (EVA) as used herein for a type of polyethylene refers to a copolymer formed form ethylene and vinyl acetate monomers wherein the ethylene derived units in the copolymer are present in major amounts and the vinyl acetate derived units in the copolymer are present in minor amounts. EVA is known not only for having structural strength, as ethylene alpha-olefin polymer does, but also for providing excellent adhesion to an adjacent layer, which decrease or eve obviate the need for an "adhesive." EVA copolymers can be hydrolyzed to ethylene vinyl alcohol copolymers, (EVOH), which are employed principally as a barrier layer according to the present invention.

The term "ethylene methylacrylate copolymer" (EMA) as used herein for a type of polyethylene refers to a copolymer formed form ethylene and vinyl acetate monomers The term "ethylene ethylacrylate copolymer" (EEA) as used herein for a type of polyethylene, refers to a copolymer formed from ethylene and ethylacrylate monomers.

The term "ethylene butyl acrylate copolymer" (EBA) as used herein for a type of polyethylene, refers to a copolymer formed from ethylene and butyl acrylate monomers.

Blends of all families of polyethylenes, such as blends of EVA, EVOH, EMA, EEA, EBA, lower density ethylene alpha-olefin copolymers, EMAA (ethylene methacrylic acid copolymer) EAA (ethylene acrylic acid copolymer) and ethylene alpha-olefin copolymers, may also be advantageously employed.

The term "oriented" is also used herein interchangeably with the term "heat shrinkable," these terms designating a material which has been stretched and set by cooling while substantially retaining its stretched dimensions. An oriented (i.e. heat shrinkable) material will tend to return to its original unstretched (unextended) dimension when heated to an appropriate elevated temperature.

The cook-in film of the present invention is preferably oriented and is formed by extrusion processes especially art-known coextrusion methods. It is initially cooled to by, for example, cascading water quenching, after which it is reheated to within its orientation temperature range and oriented by stretching. The stretching to orient may be accomplished in many ways such as, for example, by "blown bubble" techniques or "tenter framing." These processes are well known to those skilled in the art and refer to orientation procedures whereby the material is stretched in the cross or transverse direction (TD) and/or in the longitudinal or machine direction (MD). After being stretched, the film is quickly quenched while substantially retaining its stretched dimensions to cool the film rapidly and thus set or lock in the oriented molecular configuration.

If a film having little or no orientation is desired, e.g. nonoriented or non-heat shrinkable film, the film may be formed from a nonorientable material or, if formed from an orientable material may be "hot blown." In forming a hot blown film, the film is not cooled immediately after extrusion or coextrusion but rather is first stretched shortly after extrusion while the film is still at an elevated temperature above the orientation temperature range of the material. Thereafter, the film is cooled, by well known methods. Those having skill in the art are familiar with this process and the fact that the resulting film has substantially unoriented characteristics. Other methods for forming unoriented films are well known such as cast extrusion or cast coextrusion methods.

Whichever film has been made (the nonoriented molecular configuration or the stretch oriented molecular configuration), it may as noted before, be subjected to an energetic radiation surface treatment, which is advantageously provided by a high energy electron treatment. It may be irradiated, for example, by guiding it through the beam of an electron accelerator to receive a radiation dosage up to about 12 MR, more preferably a dosage in the range of about 2–9 MR. The product to be packaged may first be enclosed in the material by heat sealing the film to itself where necessary and appropriate to form a pouch or bag and then inserting the product therein. If the material is manufactured by the "blown bubble" technique in tubular form it may be slit and opened up to form a sheet of film material which can be utilized to overwrap the product. These packaging methods are all well known to those skilled in the art.

If the material is heat shrinkable, the enclosed product may be subjected to elevated temperatures, for example, by passing it through a hot air or hot water tunnel. This causes the heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bag or pouch forming methods, likewise, are well known to those skilled in the art.

As noted, the film layers may be formed by coextrusion, with additional layers thereafter being extrusion coated thereon to form multilayer films. Two multilayer tubes may also be formed with one of the tubes thereafter being extrusion coated or laminated onto the other. The extrusion coating method of film formation is preferable to coextruding the entire film when ti is desired to subject one or more layers of the film to a treatment which may be harmful to one or more of the other layers. This may be done where it is desired to irradiate one or more layers of a film with high energy electrons where the film contains a barrier layer of one or more copolymers of vinylidene chloride (e.g., Saran TM), such as vinylidene chloride and vinyl chloride or vinylidene chloride and methyl acrylate as well as vinylidene chloride with ethyl acrylate or acrylonitrile.

Films of this type would, for example, comprise those where the barrier layer is a Saran TM layer in addition to or instead of an EVOH layer. Those skilled in the art generally recognize that irradiation with high energy electrons is generally harmful to such Saran TM barrier layer compositions, as irradiation may degrade and discolor Saran TM, making it turn brown. Thus, if full coextrusion followed by high energy electron irradiation of the multilayer structure is carried out on a film having a barrier layer containing a Saran TM layer, the irradiation should be conducted at low levels and with care. Alternatively, this may e avoided by extruding a first layer or layers, subjecting the layer or layers to high energy electron irradiation and thereafter applying the Saran TM barrier layer and, for that matter, other layers (which may or may not have been irradiated) sequentially onto the outer surface of the extruded previously irradiated tube. This sequence allows for high energy electron irradiation of the first layer or layers without subjecting the Saran TM barrier layer to harmful discoloration.

Thus, as used herein the term "extrusion" or the term "extruding" is intended to include coextrusion, extrusion coating, or combinations thereof.

The above general outline for manufacturing of films is not meant to be all inclusive since such processes are well known as set forth in U.S. Pat. Nos. 4,272,900; 4,229,241; 4,194,039; 4,188,443; 4,048,428; 3,821,182 and 3,022,543.

The following examples are illustrative of the invention.

Cook-in films having the following layers were prepared by a conventional extrusion process.

| | Layers 1 Sealant | 2 Core | 3 Tie | 4 Barrier | 5 Tie | 6 Abuse |
|---|---|---|---|---|---|---|
| Ex. 1 2.35 mils | IONOMER | EVA-1 (70%) EAO-1 (30%) | R-AD | EVOH | R-AD | EVA-1(90%) HDPE(10%) |
| % thickness | 21.14 | 32.08 | 6.19 | 8.45 | 6.19 | 25.95 |
| Ex. 2 3.0 mils | IONOMER | EVA-1 (70%) EAO-1 (30%) | R-AD | EVOH | R-AD | EVA-1(90%) HDPE-1(10%) |
| % thickness | 21.09 | 33.67 | 5.06 | 6.90 | 5.06 | 28.22 |
| Ex. 3 2.35 mils | IONOMER | EVA-2 (80%) EAO-1 (20%) | R-AD | EVOH | R-AD | EVA-2 |
| % thickness | 21.05 | 29.82 | 6.43 | 7.02 | 6.43 | 29.24 |
| Ex. 4 2.35 mls | IONOMER | EVA-2 (70%) EAO-1 (30%) | R-AD | EVOH | R-AD | EVA-2 |
| % thickness | 21.05 | 29.82 | 6.43 | 7.02 | 6.43 | 29.24 |
| Ex. 5 2.35 mls | IONOMER | EVA-2 (80%) EAO-1 (20%) | R-AD | EVOH | R-AD | EVA-2 |
| % thickness | 21.05 | 32.75 | 6.43 | 7.02 | 6.43 | 26.32 |

-continued

| | Layers 1 Sealant | 2 Core | 3 Tie | 4 Barrier | 5 Tie | 6 Abuse |
|---|---|---|---|---|---|---|
| Ex. 6 2.35 mils | IONOMER | EVA-2 (80%) EAO-1 (20%) | R-AD | EVOH | R-AD | EVA-2(80%) HDPE-2(20%) |
| % thickness | 21.05 | 29.82 | 6.43 | 7.02 | 6.43 | 29.24 |
| Ex. 7 2.35 mils | IONOMER | EVA-2 (80%) EAO-1 (20%) | R-AD | EVOH | R-AD | EVA-2(80%) HDPE-1(20%) |
| % thickness | 21.05 | 29.82 | 6.43 | 7.02 | 6.43 | 29.24 |
| Ex. 8 3.0 mils | IONOMER | EVA-2 (80%) EAO-1 (20%) | R-AD | EVOH | R-AD | EVA-2 |
| % thickness | 20.95 | 31.43 | 5.24 | 5.71 | 5.24 | 31.43 |
| Ex. 9 3.0 mils | IONOMER | EVA-2 (70%) EAO-1 (30%) | R-AD | EVOH | R-AD | EVA-2 |
| % thickness | 20.95 | 31.43 | 5.24 | 5.71 | 5.24 | 31.43 |
| Ex. 10 3.0 mils | IONOMER | EVA-2 (80%) EAO-1 (20%) | R-AD | EVOH | R-AD | EVA-2 |
| % thickness | 20.95 | 31.43 | 5.24 | 5.71 | 5.24 | 31.43 |
| Ex. 11 3.0 mils | IONOMER | EVA-2 (80%) EAO-1 (20%) | R-AD | EVOH | R-AD | 3VA-2(80%) HDPE-2(20%) |
| % thickness | 20.95 | 31.43 | 5.24 | 5.71 | 5.24 | 31.43 |
| Ex. 12 3.0 mils | IONOMER | EVA-2 (80%) EAO-1 (20%) | R-AD | EVOH | R-AD | EVA-2(80%) HDPE-1(20%) |
| % thickness | 20.95 | 31.43 | 5.24 | 5.71 | 5.24 | 31.43 |
| Ex. 13 2.6 mils | IONOMER | EVA-1 (25%) EAO-1 (40%) COLOR-1 (35%) | R-AD | EVOH | R-AD | EVA-1(90%) HDPE-1(20%) |
| % thickness | 19.89 | 33.70 | 6.07 | 6.63 | 6.07 | 27.62 |
| Ex. 14 2.35 mils | IONOMER | EVA-1 (50%) EAO-1 (40%) COLOR-1 (10%) | R-AD | EVOH | R-AD | EVA-1(74%) HDPE-1(10%) COLOR-2(16%) |
| % thickness | 21.05 | 32.75 | 6.43 | 7.02 | 6.93 | 26.32 |
| Ex. 15 3.0 mils | IONOMER | EVA-1 (50%) EAO-1 (40%) COLOR-1 (10%) | R-AD | EVOH | R-AD | EVA-1(74%) HDPE-1(10%) COLOR-2(16%) |
| % thickness | 20.95 | 39.29 | 5.24 | 5.71 | 5.24 | 28.57 |
| Ex. 16 2.35 mils | EPC | EVA-2 (70%) EAO-2 (30%) | R-AD | EVOH | R-AD | EVA-2(80%) EAO-1(20%) |
| % thickness | 21.66 | 21.40 | 6.42 | 8.70 | 6.42 | 35.4 |
| Ex. 17 2.35 mils | EPC | EVA-1 (70%) EAO-2 (30%) | R-AD | EVOH | R-AD | EVA-1(80%) EAO-1(20%) |
| % thickness | 21.66 | 21.40 | 6.42 | 8.70 | 6.42 | 35.4 |
| Prior Art 1 2.35 mils | Ionomer | EBA-1 (80%) EAO-1 (20%) | R-AD | EVOH | R-AD | EAO-3(60%) EBA-1(40%) |
| % thickness | 20.88 | 29.53 | 6.61 | 6.84 | 6.61 | 29.53 |
| Prior Art 2 2.35 mils | EPC | EBA-2 (50%) EAO-3 (50%) | R-AD | EVOH | R-AD | EBA-1(61%) EAO-3(39%) |
| % thickness | 22.02 | 22.02 | 6.45 | 6.78 | 6.45 | 36.28 |

In the foregoing Examples the following materials were employed:

| | |
|---|---|
| IONOMER | a zinc salt of an ethylene methacrylic acid copolymer sold as Surlyn 1650 by DuPont |
| EVA-1 | an ethylene vinyl acetate copolymer having a vinyl acetate content of about 6.5% by weight sold as PE 1651cs28 by Rexene including an antioxidant. |
| EVA-2 | an ethylene vinyl acetate copolymer having a vinyl acetate content of about 6.5% by weight sold as PE1651 by Rexene, including a different antioxidant from that found in EVA-1. |
| EAO-1 | a linear ethylene 1-octene copolymer having a density of 0.920 g/cm$^3$ sold as Dowlex 2045.03 by Dow |
| EAO-2 | an ethylene propylene copolymer having 20% by mole of propylene and sold as Tafmer P-0480 by Mitsui |
| R-AD | a rubber modified anhydride grafted linear ethylene alph-olefin copolymer sold as Tymor 1203 by Morton International |
| EVOH | an ethylene vinyl alcohol copolymer having about 44% by weight of ethylene and sold as Eval LC-E105A by Eval of America |
| HDPE-1 | a high density polyethylene sold as Fortiflex J60-800C-147 by Soltex |
| HDPE-2 | a high density polyethylene sold as Alathon 7850 by Oxychem |
| COLOR-1 | a 50% TiO$_2$/50% low density polyethylene color concentrate sold as EPE 10214-C by Teknor Color |
| COLOR-2 | a red color concentrate sold as EV-8598 by Teknor Color |
| EPC | a propylene ethylene copolymer having about 3.2% by weight of ethylene and sold as Eltex P KS 409 by Solvay |
| EBA-1 | an ethylene butyl acrylate copolymer having about 18.5% by weight of butyl acrylate sold as EA 719-009 by Quantum USI. |
| EBA-2 | an ethylene butyl acrylate copolymer having about 5% by weight of butyl acrylate and sold as EA 705-009 by Quatum/USI |

The foregoing films were biaxially oriented (MD 300-330%; TD 210-250%) by employing the blown bubble method as described herein and both have improved bubble stability when compared to cook-in films that do not employ the core layer of the present invention. Furthermore, lower shrink temperature settings are obtainable.

EXAMPLE 18

Twenty bags such as described in Examples 3, 4, 5, 7, 8, 10, 12, and Prior Art Bag 1 (P.A.) were heat sealed at one end on conventional equipment well known in the art of heat sealing of tubing, and a mouth end of each bas was left open.

Each bag was then clamped in a fixture provided with a hose. The open mouth end of each bag was clamped around the hose. Air was pumped through each hose whereby each bag was inflated to the same initial pressure. Each fixture retained each inflated bag in air at 23 C and two sides of each bag were respectively restrained by two metal plates spaced about 10 cm apart. The pressure was increased via the hose at the rate of 1 inch of water pressure (2491 dynes/cm$^2$) per second until the heat seal for that bag either leaked or burst open at the IOWP (inches of water pressure) designated below in Table 1.

TABLE 1

| Sample Number | FILM OF EXAMPLE NUMBER | | | | | | | |
|---|---|---|---|---|---|---|---|---|
| | 3 | 4 | 5 | 7 | 8 | 10 | 12 | P.A. |
| 1 | 206 | 196 | 208 | 205 | 236 | 242 | 205 | 112 |
| 2 | 205 | 197 | 202 | 211 | 240 | 250 | 210 | 112 |
| 3 | 204 | 202 | 199 | 211 | 237 | 231 | 247 | 114 |
| 4 | 200 | 201 | 190 | 220 | 238 | 226 | 208 | 116 |
| 5 | 205 | 201 | 208 | 209 | 223 | 225 | 220 | 122 |
| 6 | 195 | 245 | 202 | 208 | 234 | 227 | 230 | 120 |
| 7 | 197 | 198 | 205 | 220 | 239 | 230 | 229 | 118 |
| 8 | 205 | 203 | 207 | 218 | 239 | 230 | 229 | 121 |
| 9 | 207 | 199 | 192 | 219 | 240 | 240 | 218 | 127 |
| 10 | 190 | 195 | 204 | 212 | 230 | 237 | 240 | 114 |
| 11 | 209 | 206 | 203 | 203 | 230 | 238 | 249 | 112 |
| 12 | 203 | 187 | 209 | 212 | 239 | 208 | 247 | 117 |
| 13 | 202 | 187 | 212 | 210 | 233 | 228 | 264 | 120 |
| 14 | 202 | 207 | 209 | 205 | 221 | 239 | 219 | 121 |
| 15 | 188 | 198 | 208 | 220 | 278 | 220 | 245 | 120 |
| 16 | 197 | 192 | 202 | 200 | 236 | 237 | 239 | 111 |
| 17 | 197 | 201 | 206 | 213 | 233 | 236 | 248 | 118 |
| 18 | 201 | 209 | 210 | 212 | 226 | 203 | 259 | 119 |
| 19 | 161 | 190 | 204 | 220 | 240 | 238 | 258 | 136 |
| 20 | 203 | 199 | 212 | 218 | 248 | 247 | 254 | 121 |

EXAMPLE 19

Twenty bags such as described in Examples 3, 4, 5, 7, 8, 10, 12, and Prior Art Bag 1 (P.A.) were heat sealed at one end on conventional equipment well known in the art of heat sealing of tubing, and a mouth end of each bag was left open. Prior to heat sealing, the inside surface of the heat seal area was smeared with a thin layer of peanut oil. Peanut oil was used to simulate the fats and oils present in many food products.

Each bas was then clamped n a fixture provided with a hose. The open mouth end of each bag was clamped around the hose. Air was pumped through each hose whereby each bag was inflated to the same initial pressure. The each fixture lowered the heat sealed end of each inflated bag approximately 5 cm into a hot water bath a 83 C. The pressure was increased via the hose at the rate of 2 inches of water pressure (4982 dynes/cm$^2$) per second until the heat seal for that bag either leaked or burst open at the IOWP (inches of water pressure) designated below in Table 2. The number of seconds taken to reach the burst or leak are shown in Table 3.

TABLE 2

| Sample Number | FILM OF EXAMPLE NUMBER | | | | | | | |
|---|---|---|---|---|---|---|---|---|
| | 3 | 4 | 5 | 7 | 8 | 10 | 12 | P.A. |
| 1 | 61 | 65 | 64 | 63 | 64 | 64 | 67 | 55 |
| 2 | 59 | 60 | 65 | 60 | 63 | 62 | 66 | 55 |
| 3 | 63 | 74 | 61 | 61 | 63 | 59 | 69 | 54 |
| 4 | 61 | 65 | 61 | 64 | 65 | 62 | 68 | 53 |
| 5 | 62 | 66 | 60 | 61 | 65 | 61 | 65 | 54 |
| 6 | 59 | 63 | 65 | 61 | 61 | 63 | 68 | 51 |
| 7 | 59 | 64 | 62 | 60 | 60 | 63 | 67 | 54 |
| 8 | 58 | 66 | 63 | 60 | 61 | 57 | 66 | 53 |
| 9 | 60 | 63 | 66 | 63 | 64 | 62 | 68 | 51 |
| 10 | 59 | 65 | 63 | 65 | 63 | 63 | 66 | 53 |
| 11 | 59 | 65 | 62 | 61 | 62 | 63 | 65 | 52 |
| 12 | 61 | 60 | 63 | 63 | 63 | 64 | 68 | 50 |
| 13 | 61 | 64 | 65 | 63 | 63 | 61 | 65 | 52 |
| 14 | 58 | 62 | 67 | 61 | 62 | 62 | 67 | 52 |
| 15 | 59 | 65 | 64 | 65 | 70 | 61 | 66 | 53 |
| 16 | 61 | 66 | 64 | 61 | 63 | 63 | 68 | 54 |
| 17 | 59 | 62 | 59 | 62 | 64 | 62 | 64 | 58 |
| 18 | 57 | 66 | 63 | 63 | 63 | 63 | 66 | 58 |
| 19 | 60 | 65 | 64 | 59 | 64 | 65 | 67 | 55 |
| 20 | 57 | 64 | 63 | 63 | 62 | 65 | 67 | 51 |

TABLE 3

| Sample Number | FILM OF EXAMPLE NUMBER | | | | | | | |
|---|---|---|---|---|---|---|---|---|
| | 3 | 4 | 5 | 7 | 8 | 10 | 12 | P.A. |
| 1 | 30.0 | 32.0 | 31.0 | 30.6 | 31.3 | 31.4 | 33.0 | 26.5 |
| 2 | 29.1 | 39.4 | 31.7 | 29.4 | 30.5 | 30.1 | 32.1 | 26.8 |
| 3 | 31.1 | 36.7 | 29.8 | 29.9 | 30.1 | 29.5 | 34.1 | 26.2 |
| 4 | 29.7 | 32.0 | 29.7 | 31.2 | 32.0 | 30.8 | 33.1 | 26.0 |
| 5 | 30.1 | 32.1 | 29.1 | 29.8 | 31.9 | 30.9 | 32.0 | 26.1 |
| 6 | 28.7 | 31.1 | 31.6 | 29.8 | 30.1 | 31.0 | 33.0 | 24.8 |
| 7 | 29.0 | 31.3 | 30.3 | 29.4 | 29.4 | 30.8 | 32.5 | 26.4 |
| 8 | 28.5 | 32.5 | 30.9 | 29.6 | 29.6 | 29.3 | 32.2 | 25.6 |
| 9 | 29.6 | 30.8 | 32.4 | 30.7 | 31.2 | 30.8 | 33.2 | 25.3 |
| 10 | 29.1 | 32.0 | 31.1 | 31.6 | 30.9 | 30.8 | 32.6 | 26.0 |
| 11 | 28.9 | 31.9 | 30.2 | 30.0 | 30.1 | 30.7 | 31.8 | 25.3 |
| 12 | 29.6 | 29.5 | 30.9 | 31.0 | 30.9 | 31.6 | 33.2 | 24.2 |
| 13 | 29.6 | 31.3 | 31.7 | 30.8 | 30.5 | 30.2 | 31.8 | 25.5 |
| 14 | 28.5 | 30.7 | 32.5 | 30.0 | 30.4 | 30.6 | 32.8 | 25.4 |
| 15 | 28.9 | 31.6 | 31.2 | 31.8 | 34.4 | 30.3 | 32.0 | 26.0 |
| 16 | 29.9 | 32.2 | 31.2 | 30.0 | 30.6 | 31.2 | 33.3 | 26.4 |
| 17 | 28.7 | 30.5 | 29.0 | 30.2 | 31.1 | 30.1 | 31.1 | 28.0 |
| 18 | 28.1 | 32.2 | 31.0 | 31.0 | 30.3 | 30.6 | 32.5 | 28.4 |
| 19 | 29.1 | 31.9 | 31.5 | 29.1 | 31.3 | 31.7 | 32.9 | 26.6 |
| 20 | 27.8 | 31.1 | 30.7 | 30.8 | 30.4 | 32.2 | 32.8 | 24.3 |

EXAMPLE 20

Twenty bags such as described in Example 16 and Prior Art bag 2 (P.A.) were heat sealed at one end on conventional equipment well known in the art of heat sealing of tubing, and a mouth end of each bag was left open.

Each bag was then clamped in a fixture provided with a hose. The open mouth end of each bag was clamped around the hose. Air was pumped through each hose whereby each bag was inflated to the same initial pressure. Each fixture retained each inflated bag in air at 23 C and two sides of each bag were respectively restrained by two metal plates spaced about 10 cm apart. The pressure was increased via the hose at the rate of 1 inch of water pressure (2491 dynes/cm$^2$) per second until the heat seal for that bag either leaked or burst open at the IOWP (inches of water pressure) designated below in Table 4.

TABLE 4

| Sample Number | FILM OF EXAMPLE NUMBER | |
|---|---|---|
| | 16 | P.A. |
| 1 | 170 | 148 |
| 2 | 163 | 148 |
| 3 | 181 | 148 |

TABLE 4-continued

| Sample Number | FILM OF EXAMPLE NUMBER | |
|---|---|---|
| | 16 | P.A. |
| 4 | 170 | 139 |
| 5 | 180 | 150 |
| 6 | 152 | 157 |
| 7 | 182 | 150 |
| 8 | 160 | 147 |
| 9 | 182 | 127 |
| 10 | 172 | 152 |
| 11 | 165 | 150 |
| 12 | 171 | 130 |
| 13 | 162 | 138 |
| 14 | 161 | 141 |
| 15 | 170 | 150 |
| 16 | 170 | 148 |
| 17 | 172 | 149 |
| 18 | 163 | 154 |
| 19 | 171 | 152 |
| 20 | 165 | 151 |

EXAMPLE 21

Twenty bags such as described in Example 16 and Prior Art Bag 2 (P.A.) were heat sealed at one end on conventional equipment well known in the art of heat sealing of tubing, and a mouth end of each bag was left open. Prior to heat sealing, the inside surface of the heat seal area was smeared with a thin layer of peanut oil. Peanut oil was used to simulate the fats and oils present in many food products.

Each bas was then clamped in a fixture provided with a hose. The open mouth end of each bag was clamped around the hose. Air was pumped through each hose whereby each bag was inflated to the same initial pressure. The each fixture lowered the heat sealed end of each inflated bag approximately 5 cm into a hot water bath a 83 C. The pressure was increased via the hose at the rate of 2 inches of water pressure (4982 dynes/cm$^2$) per second until the heat seal for that bag either leaked or burst open at the IOWP (inches of water pressure) designated below in Table 5. The number of seconds taken to reach the burst or leak are shown in parentheses.

TABLE 5

| Sample Number | FILM OF EXAMPLE NUMBER | |
|---|---|---|
| | 16 | P.A. |
| 1 | 47 (23.1) | 49 (24.6) |
| 2 | 45 (22.2) | 50 (24.7) |
| 3 | 47 (23.6) | 47 (24.0) |
| 4 | 46 (22.8) | 44 (22.6) |
| 5 | 48 (23.3) | 42 (22.2) |
| 6 | 46 (22.8) | 45 (23.2) |
| 7 | 45 (22.1) | 46 (23.8) |
| 8 | 47 (23.1) | 46 (23.8) |
| 9 | 47 (23.0) | 45 (23.0) |
| 10 | 46 (23.0) | 44 (23.3) |
| 11 | 47 (23.2) | 46 (23.0) |
| 12 | 48 (23.7) | 46 (23.5) |
| 13 | 47 (22.3) | 46 (23.7) |
| 14 | 45 (22.5) | 48 (24.0) |
| 15 | 45 (22.4) | 47 (23.9) |
| 16 | 50 (24.4) | 46 (23.4) |
| 17 | 46 (22.0) | 48 (24.0) |
| 18 | 46 (22.6) | 45 (22.5) |
| 19 | 47 (23.3) | 43 (22.5) |
| 20 | 49 (24.1) | 45 (23.1) |

The foregoing description of preferred embodiments of the invention have been presented for purposes of illustration and description. It is not intended to be exhaustive or to limit the invention t the precise form disclosed, and modifications and variations are possible in light of the above teachings or may be acquired from practice of the invention. The embodiment were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A multiple layer film, comprising:
   a sealing layer;
   a core layer, comprising a blend of a polymeric material of a fractional melt index and an ethylene alpha-olefin copolymer; and
   an abuse layer, comprising a polymeric material of a fractional metal index.

2. The film of claim 1, wherein said core layer comprises from about 60% to about 99% by weight of said polymeric material of a fractional melt index and from about 1% to about 40% by weight of an ethylene alpha-olefin.

3. The film of claim 2, wherein said core layer comprises from about 70% to about 90% by weight of said polymeric material of a fractional metal index and from about 10% to about 30% by weight of an ethylene alpha-olefin.

4. The film of claim 3, wherein said core layer comprises from about 70% to about 80% by weight of said polymeric material of a fractional melt index and from about 20% to about 30% by weight of an ethylene alpha-olefin.

5. The film of claim 1, wherein said core layer comprises from about 20% to about 60% by weight of said polymeric material of a fractional melt index, from about 5% to about 70% by weight of an ethylene alpha-olefin copolymer, and from about 10% to about 35% of a color concentrate.

6. The film of claim 5, wherein said color concentrate comprises an inorganic pigment and a polymeric carrier.

7. The film of claim 1, wherein said polymeric material of a fractional melt index is selected from the group consisting of low density polyethylene, ethylene methyl acrylate copolymer, ethylene butyl acrylate copolymer and ethylene vinyl acetate copolymer.

8. The film of claim 7, wherein said polymeric material of a fractional melt index is ethylene vinyl acetate copolymer.

9. The film of claim 1, wherein said core layer is immediately adjacent said food contacting and sealing layer.

10. The film of claim 1 further including a barrier layer.

11. The film of claim 10 wherein said barrier layer comprises an ethylene vinyl alcohol copolymer.

12. The film of claim 11 wherein said barrier layer comprises a vinylidene chloride copolymer.

13. The film of claim 1 wherein said ethylene alpha-olefin copolymer of said core layer is a copolymer of ethylene and an alpha-olefin having from three to ten carbon atoms.

14. The film of claim 11 wherein said ethylene alpha-olefin copolymer of said core layer is a copolymer of ethylene and propylene.

15. The film of claim 14 wherein said food contacting and sealing layer comprises an ethylene propylene copolymer.

16. The film of claim 14 wherein said food contacting and sealing layer comprises an ethylene, propylene, higher alpha-olefin terpolymer.

17. The film of claim 13 wherein said ethylene alpha-olefin copolymer is a copolymer of ethylene and nan alpha-olefin having from four to eight carbon atoms.

18. The film of claim 17, wherein said food contacting and sealing layer is elected from the group consisting of a linear ethylene alpha-olefin copolymer, and ethylene acrylic acid copolymer, an ethylene methacrylic acid copolymer, an ionomer, and blends thereof.

19. The film of claim 1, wherein said film comprises the multilayer film structure: first food contact layer/core layer/barrier layer/abuse layer.

20. The film of claim 19, further including a polymeric adhesive layer located on each respective surface of the barrier layer.

21. The film of claim 20 wherein said polymeric adhesive layer comprises an anhydride modified alpha-olefin copolymer having rubber moieties.

22. The film of claim 1, wherein said film is biaxially oriented to an extend corresponding to a biaxial free shrinkage at 185° F. (85° C.) of up to about 55% (ASTM D 2732).

23. The film of claim 1, wherein at least the first layer of film is cross-linked.

24. The film of claim 23 wherein at least the first layer is subjected to an energetic radiation treatment to an extent corresponding to a dosage of up to about 12 MR.

25. The film of claim 1, wherein said abuse layer further includes an ethylene homopolymer or copolymer.

26. The film of claim 25, wherein said abuse layer comprises from about 60% to about 99% by weight of said polymeric material of a fractional melt index and from about 1% to about 40% by weight of an ethylene homopolymer or copolymer.

27. The film of claim 26, wherein said abuse layer comprises from about 70% to about 90% by weight of said polymeric material of a fractional melt index and from about 10% to bout 30% by weight of an ethylene homopolymer of copolymer.

28. The film of claim 25, wherein said abuse layer comprises from about 35% to about 80% by weight of said polymeric material of a fractional melt index, from about 10% to about 30% by weight of an ethylene homopolymer or copolymer, and from about 10% to bout 35% of a color concentrate.

29. The film of claim 25, wherein said ethylene homopolymer or copolymer of the abuse layer is an ethylene alpha-olefin copolymer and is substantially similar to the ethylene alpha-olefin copolymer contained in said core layer.

30. A method for forming a film, comprising (1) mixing a polymeric material of a fractional melt index with an ethylene alpha-olefin copolymer; (2) forming said blend into a core layer; (3) forming a multiple layer film with said core layer and at lest a food contacting and sealing layer and an abuse layer.

31. The method of claim 30, which further includes forming at least the multilayer film structure: first food contact layer/core layer/barrier layer/abuse layer.

32. The method of claim 31, which further includes forming a polymeric adhesive layer disposed on each respective surface of the barrier layer.

33. The method of claim 30, wherein said film is extruded and biaxially oriented by the blown bubble method to an extent corresponding to a biaxial free shrinkage at 185° F. (85° C.) of up to about 55% (ASTM D 2732).

34. The method of claim 30, wherein at least said first layer is cross-linked.

35. The method of claim 34 wherein at least said first layer is subjected to an energetic radiation treatment corresponding to a dosage of up to about 12 MR.

* * * * *